Nov. 21, 1961   G. R. MEADOWCROFT ET AL   3,009,644
ORCHARD SPRAYER
Filed Sept. 22, 1958   7 Sheets-Sheet 1
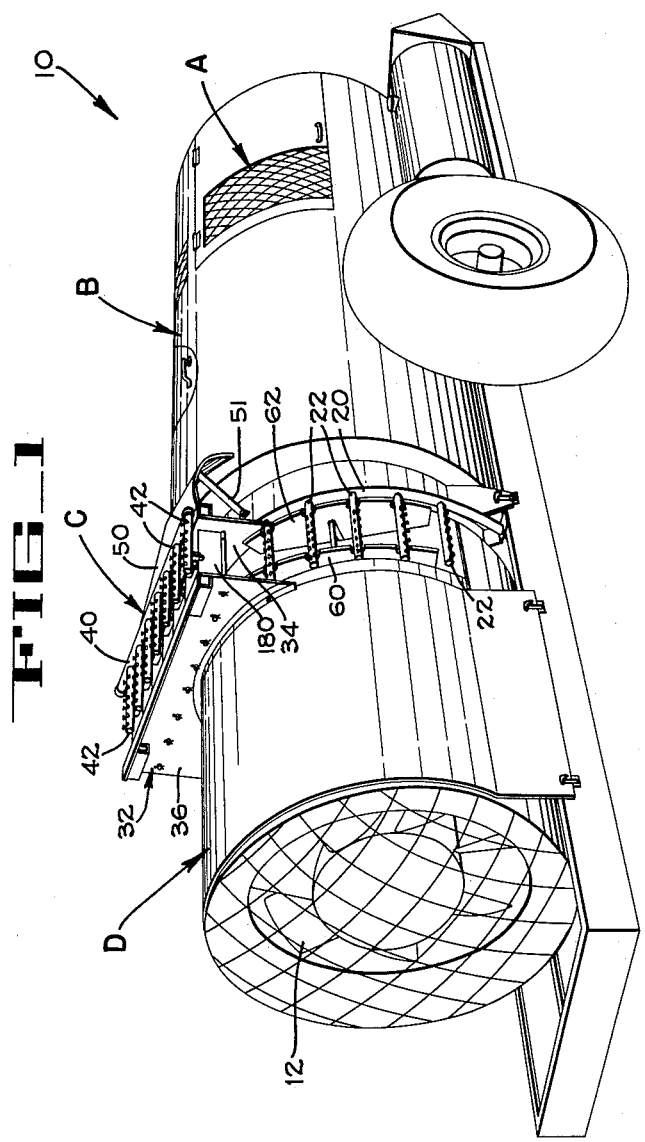
INVENTORS
GEORGE R. MEADOWCROFT
ARIEL A. WALLACE
BY
ATTORNEY

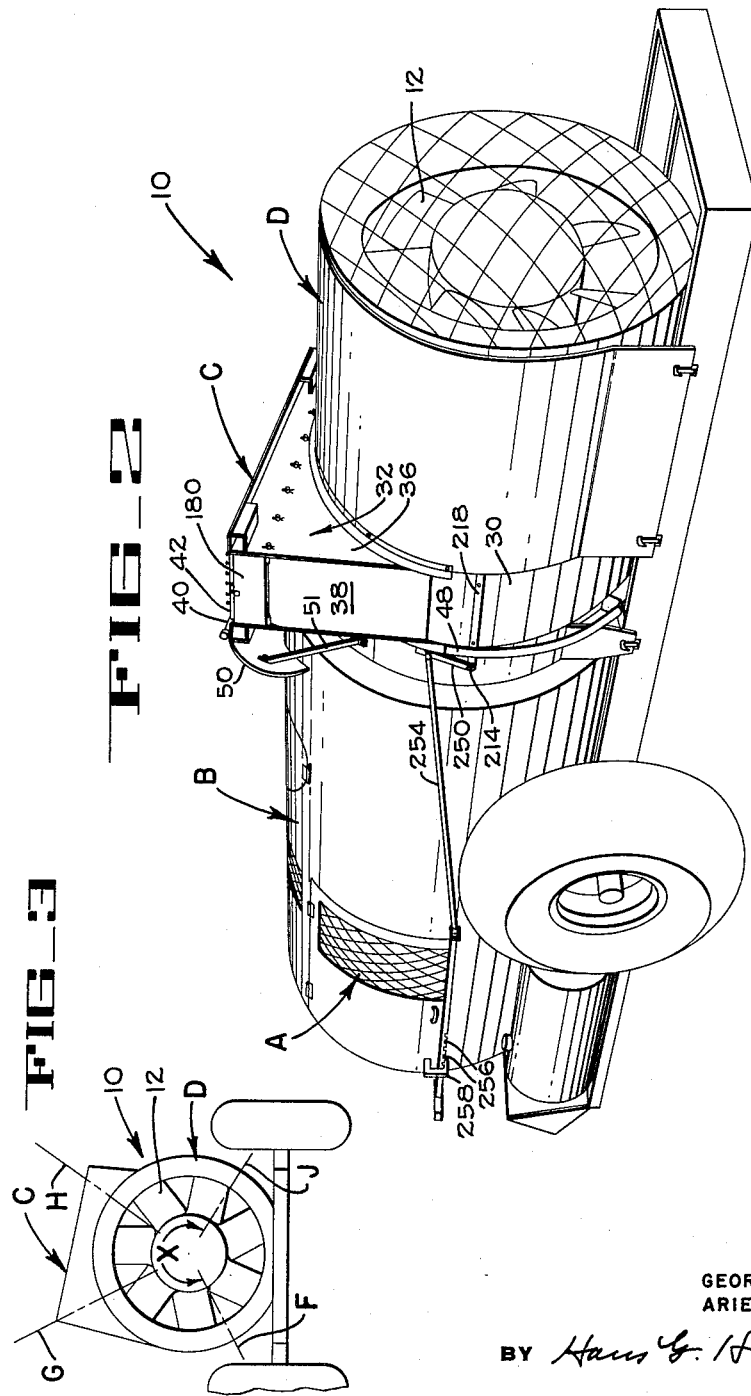

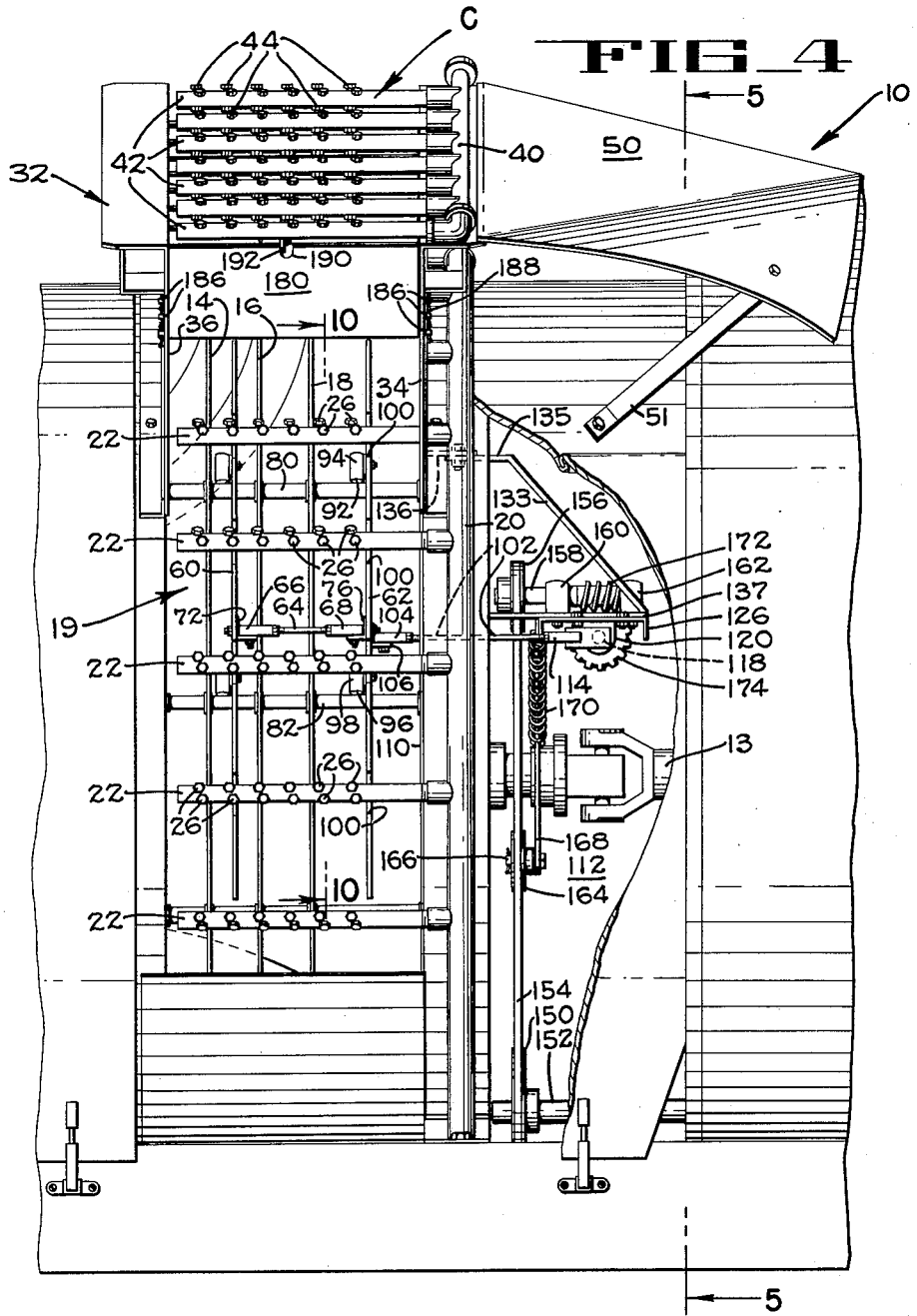

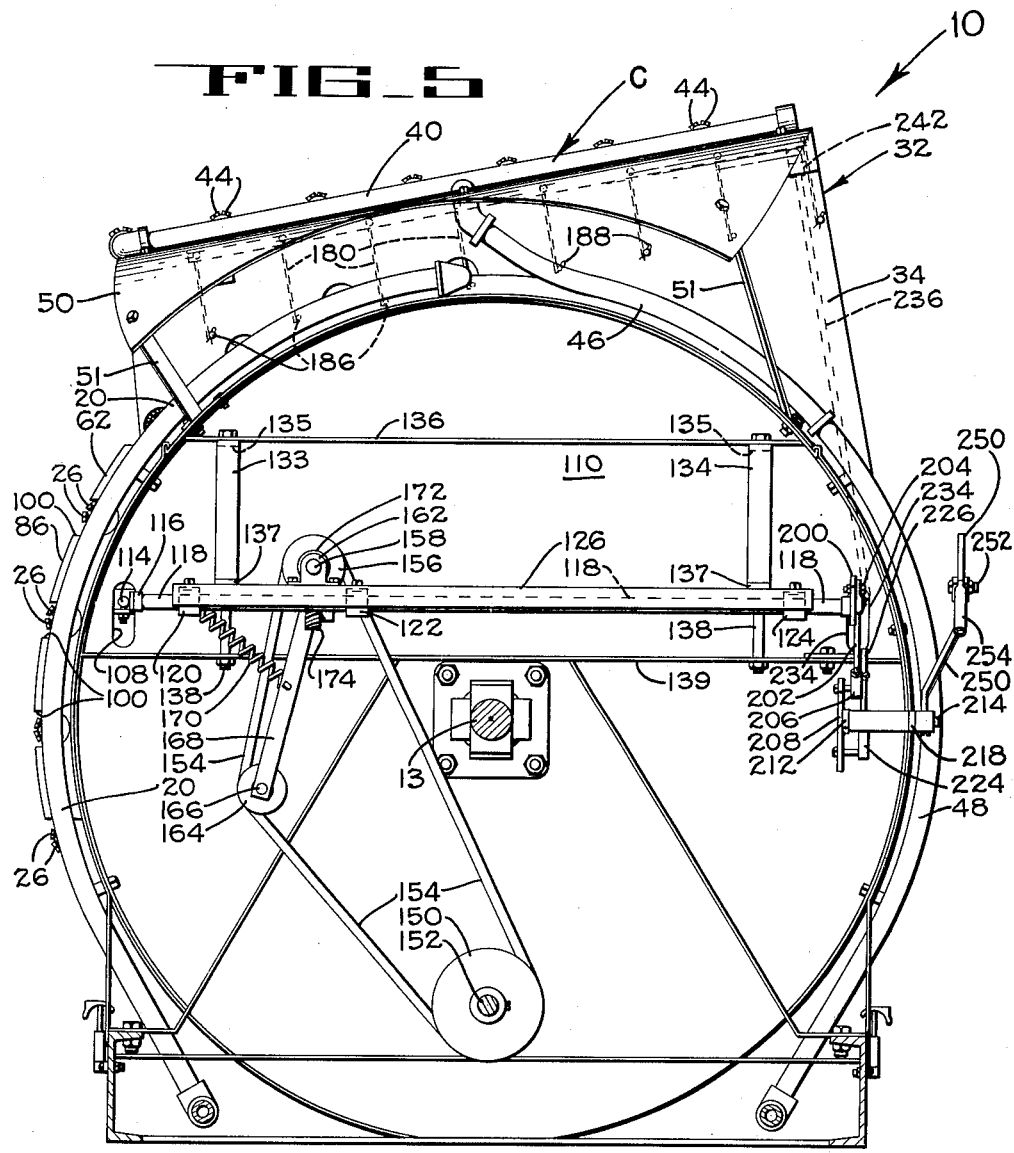

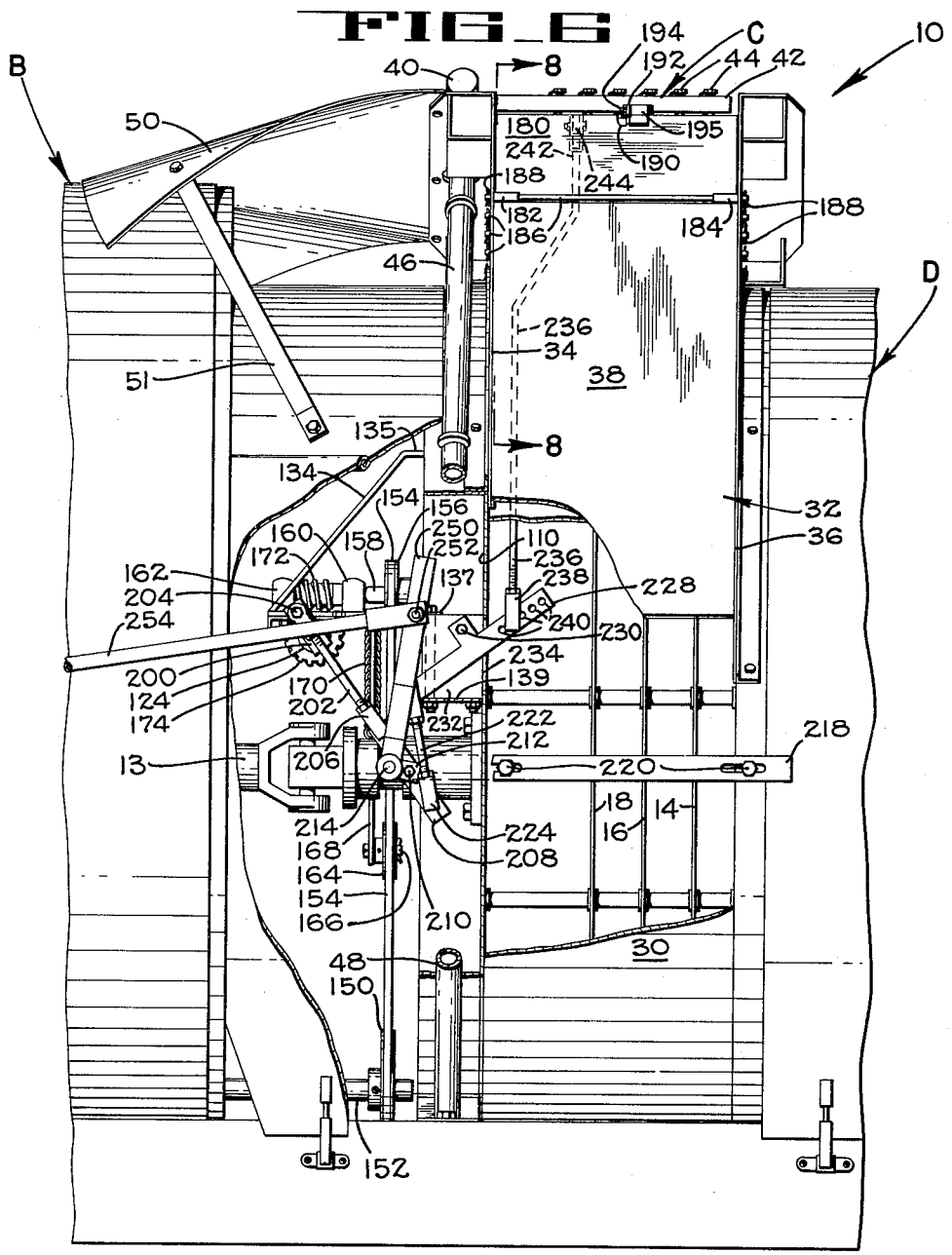

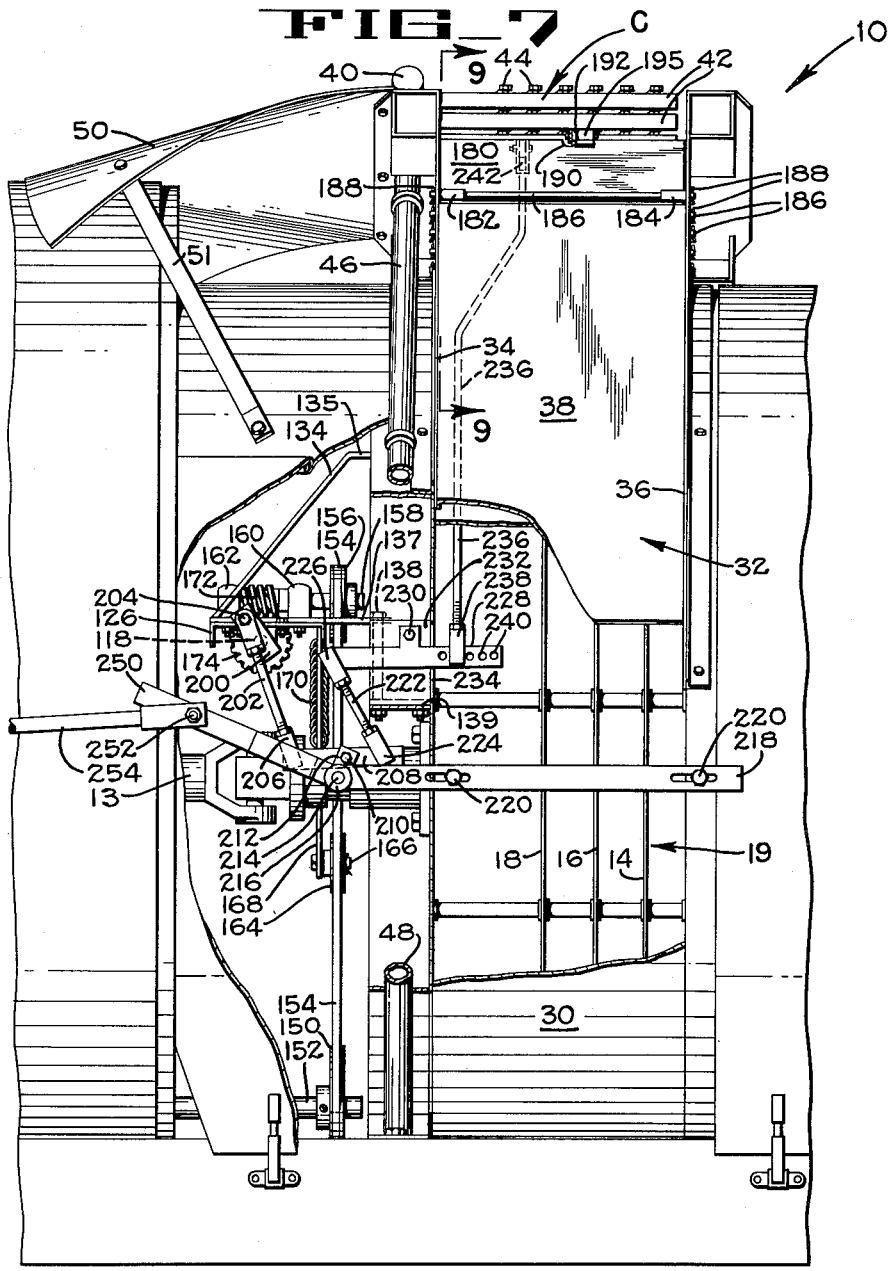

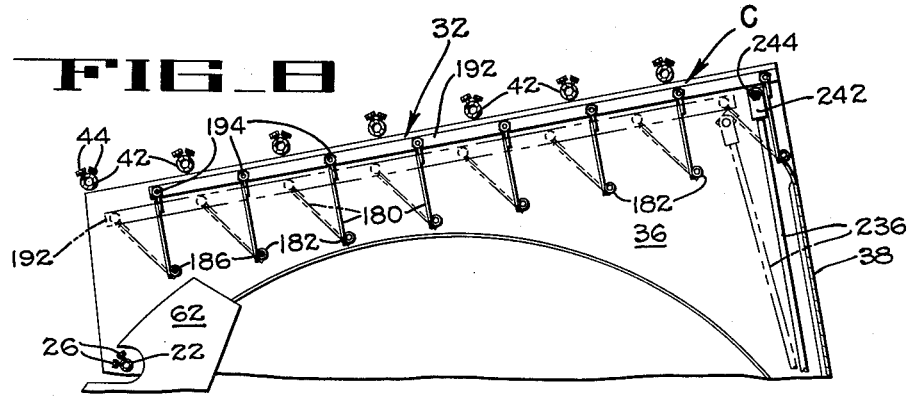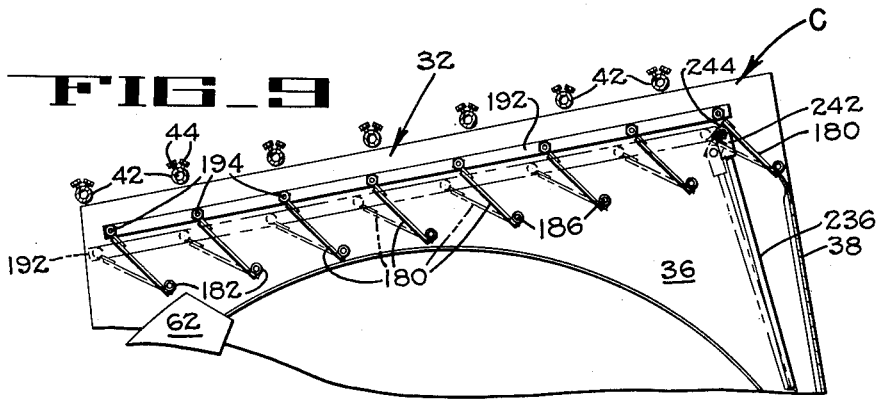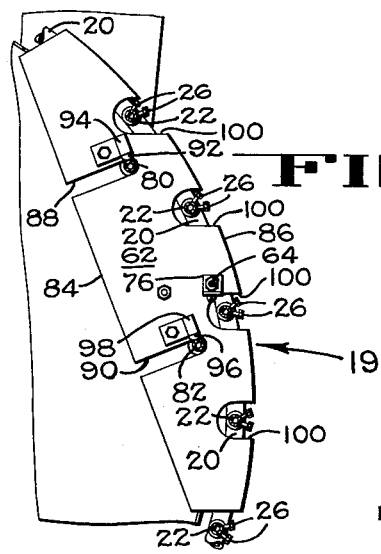

United States Patent Office 3,009,644
Patented Nov. 21, 1961

3,009,644
ORCHARD SPRAYER
George R. Meadowcroft and Ariel A. Wallace, Orlando, Fla., assignors to FMC Corporation, a corporation of Delaware
Filed Sept. 22, 1958, Ser. No. 762,504
11 Claims. (Cl. 239—78)

This invention pertains to orchard sprayers. More particularly the invention relates to an improved device for forming and concentrating the air stream of a sprayer to obtain more effective distribution of the spray pattern.

In the spraying of orchards having trees with relatively dense upper foliage, it is extremely difficult to obtain proper spray penetration of this dense upper foliage.

It is therefore an object of the present invention to provide an improved device for forming and concentrating the air stream of an orchard sprayer to aid the spray penetration of dense foliage.

Another object of the present invention is to provide a mechanism for use with an orchard sprayer to oscillate the air blast at the upper portion of the spray pattern to cause the limbs of the trees to whip and thus facilitate the spray penetration of the foliage.

Another object of this invention is to provide an attachment for an orchard sprayer to aid the spray penetration of dense foliage.

Another object is to provide an improved orchard sprayer.

These and other objects and advantages of the present invention will become apparent from the following description and accompanying drawings in which:

FIG. 1 is a perspective looking from the rear toward the front of the right hand side of an orchard sprayer incorporating the apparatus of the present invention mounted thereon.

FIG. 2 is a perspective looking at the left hand side and rear of the sprayer illustrated in FIG. 1.

FIG. 3 is a diagrammatic end elevation of the machine of FIG. 1.

FIG. 4 is a fragmentary side elevation of the spray blast outlet at the right hand side of the machine with parts broken away to show internal operating mechanism.

FIG. 5 is a vertical section taken on line 5—5 of FIG. 4.

FIG. 6 is a fragmentary side elevation of the left hand side of the machine with parts broken away to illustrate the linkage for oscillating and for controlling the range of oscillation of the air blast directing vanes in the sprayer discharge opening.

FIG. 7 is a view similar to that shown in FIG. 6 but showing the oscillating range control linkage disposed in a different operating position.

FIG. 8 is a section taken on line 8—8 of FIG. 6.

FIG. 9 is a section taken on line 9—9 of FIG. 7.

FIG. 10 is a section taken on line 10—10 of FIG. 4, and illustrates the drive for the oscillating mechanisms.

The sprayer 10 (FIG. 1) comprises an engine compartment A within which an internal combustion engine (not shown) is mounted, a spray tank section B, an air discharge section C, and a blower section D. An impeller 12 is mounted at the rear of the blower section D and is rotated by the engine through suitable drive mechanism including a shaft 13 (FIGS. 4 and 6) to draw air in through the open rear end of the blower section D and move it longitudinally of the machine toward the air discharge section C. At section C, the air stream is directed radially outwardly by a plurality of bell-shaped louvers 14, 16 and 18 (FIGS. 4, 6 and 7) of an air-deflecting head 19. Orchard sprayers of this type are usually adapted to discharge air radially outwardly from the bell-shaped louvers in a fan-like pattern that extends over the angle X (FIG. 3) that is included between radial lines F and J. With this arrangement, ordinary spraying of rows of trees on each side of the path of travel of the vehicle may be accomplished. In accordance with the present invention, an improved device for forming and concentrating the air stream is provided whereby the radial discharge at the left side of the machine, in the zone between radial lines F and G, is eliminated and the air that would ordinarily be directed out at this zone is directed upwardly and inclined toward the right to aid in penetrating the dense foliage at the upper portions of the trees. It will be evident, of course, that the usual radial air stream is directed into the side of these trees at the right side of the machine by air emitted at a zone defined by the radial lines H and J.

Spray liquid from the tank section B of the machine is pumped by a pump (not shown) into a curved spray manifold 20 at the right side of the machine (FIGS. 1 and 5) and thence into a plurality of spray distribution pipes 22 which extend transversely across the radial air blast opening on the right hand side of the machine. Each of the spray distribution pipes 22 is provided with a plurality of spray nozzles 26 (FIG. 4) which spray the insecticide or the like into the radial air blast coming from the louvers 14, 16 and 18.

The air blast opening on the left side of the machine (FIG. 2) is closed by a sheet metal cover 30, whereby the air which would normally issue therefrom is directed upwardly through a rectangular housing 32 and issues from the upper end thereof. The housing 32 is inclined so that the air blast issuing from the upper end thereof augments the upper portion of the side blast issuing from the right side of the machine.

The housing 32 comprises a front wall 34 (FIG. 1), a rear wall 36 (FIG. 2), and a left side wall 38 which joins the sheet metal cover 30. The walls 34 and 36 have flanged lower edges bolted to the frame of the air-deflecting head 19. A spray manifold 40 (FIG. 1) is mounted on the housing 32 adjacent and parallel to the upper edge of the front wall 34 of the housing 32, and a plurality of spray distribution pipes 42 are connected thereto and extend transversely across the open upper end of the housing 32. Each of the spray distribution pipes 42 is provided with a plurality of spray nozzles 44 (FIG. 4) adapted to spray the liquid into the air blast issuing from the housing 32. The spray manifold 40 is connected by a conduit 46 (FIG. 5) to a supply manifold 48 adjacent the left side of the machine, said supply manifold being connected to the spray pump (not shown) of the machine.

A shield 50 (FIGS. 1, 4 and 5) is fixed to the front upper edge of the housing 32 by straps 51. The shield extends forwardly and downwardly from the housing 32 and joins the rounded upper surface of the tank section B of the machine to lift low lying branches and prevent their catching on the housing as the machine is moved through an orchard.

Two oscillating vanes 60 and 62 (FIGS. 4 and 10) are mounted in the air discharge outlet at the right side of the machine to alternately shift the air blast back and forth in a direction longitudinally of the vehicle. The two vanes 60 and 62 are connected by a connecting rod 64 having ball and socket joints 66 and 68 at its opposite ends. The ball and socket joint 66 is fixed to a bracket 72 which in turn is fixed to the vane 60. The joint 68 is similarly fixed to a bracket 76 fixed to the vane 62, whereby the vanes 60 and 62 are interconnected for conjoint movement.

The two vanes 60 and 62 are both similarly shaped and both are pivotally mounted in the same manner and only the vane 62 will therefore be described in detail. Two rods 80 and 82 (FIGS. 4 and 10) are fixed to the frame of the air-deflecting head 19 and extend transversely across the air discharge opening. The vane 62 has a straight inner edge 84 and an arcuate outer edge 86 shaped to be concentric with the outer surface of the machine. The inner edge of the vane 62 is provided with a pair of slots 88 and 90 adapted to fit over the rods 80 and 82, respectively. A substantially vertically extending pivot pin 92 is fixed to the rod 80 and is received within a tubular bushing 94 fixed to the vane 62. Similarly, a substantially vertically extending pivot pin 96, which is fixed to the rod 82 so that its axis coincides with the axis of pin 92, is adapted to be received within a tubular bushing 98 fixed to the vane 62. The outer edge 86 of the vane 62 is provided with a plurality of cut out portions or slots 100 (FIG. 10) to fit around the spray distribution pipes 22.

The mechanism for oscillating the vane 62 about the axes of the pins 92 and 96, and thus also oscillating the vane 60 which is similarly mounted and is connected to the vane 62 in the manner described above, comprises an operating rod 102 (FIG. 4) having one end connected by a ball and socket joint 104 to a bracket 106 fixed to the vane 62. The rod 102 extends through an opening 108 (FIG. 5) formed in a vertical wall 110 of the air-turning head 19. The end of the operating rod 102 within the compartment 112 is connected by a ball and socket joint 114 to a crank 116 fixed to the end of a transversely extending shaft 118.

The shaft 118 is rotatably mounted in suitable bearings 120, 122 and 124 (FIG. 5) fixed to an inverted channel bracket 126 which is bolted to the undersurfaces of two rigid, generally V-shaped braces 133 and 134. One end 135 (FIG. 4) of each brace is bolted to a rigid flange 136 that projects outwardly from the wall 110. The other end 137 of each strap is secured to a vertical bolt 138 which is connected to and projects upwardly from a second stiffening flange 139.

The mechanism for rotating the shaft 118 comprises a drive pulley 150 (FIG. 5) fixed to an auxiliary drive shaft 152 which is driven by the main engine of the machine. A belt 154 connects the pulley 150 with a pulley 156 fixed to a shaft 158 rotatably mounted in suitable bearings 160 and 162 (FIG. 4) fixed to the channel 126. A belt tightening idler pulley 164 (FIG. 5) engages the belt 154 and is rotatably mounted on a suitable stub shaft 166 fixed to one end of an arm 168, the other end of which is pivotally mounted to the channel bracket 126. A tension spring 170 is interconnected between the arm 168 and the bracket 126 to maintain tension on the drive belt 154. A worm 172 (FIG. 7) is fixed to the shaft 158 and meshes with a worm wheel 174 fixed to the shaft 118.

From the structure just described, it will be appreciated that, whenever the main drive engine is operating, the shaft 118 is rotating and causing the vanes 60 and 62 to oscillate about the substantially vertical axes of their mountings to continually oscillate the spray pattern issuing from the right side of the machine in a direction fore and aft of the machine.

A plurality of air blast directing vanes 180 (FIG. 5) are mounted within the housing 32 adjacent the discharge opening thereof. The vanes 180 are all identical. Each of the vanes 180 is rectangular in form (FIG. 6) and is provided adjacent its lower edge with a pair of bushings 182 and 184, one adjacent either end thereof. A rod 186 extends through the bushings 182 and 184 of each vane and through suitable openings provided in the front and rear walls 34 and 36, respectively, of the housing 32. Each rod 186 is held in place by suitable cotter keys 188 which are disposed in holes at the ends of the rods.

Each of the vanes 180 is pivotally mounted for movement about its associated pivot rod 186. The pivot rods 186 (FIGS. 8 and 9) are equally spaced from each other, and are on a line parallel to the upper end of housing 32 and spaced therefrom a distance slightly greater than the width of the vanes 180 so that the outer free end of each vane will clear the spray distribution pipes 42.

The free end of each of the vanes 180 is provided with a notch 190 (FIG. 6) adjacent its mid portion to accommodate a tie bar 192 which carries a plurality of laterally projecting pivot pins 194 (FIG. 8) that are disposed at equally spaced points along its length. The pins 194 are received within suitable bushings 195 (FIG. 6) one of which is fixed on each of the vanes 180 adjacent the notch 190. The tie bar 192 thus connects together the free ends of all of the vanes 180, whereby, the vanes always remain parallel with each other and are interconnected for conjoint pivotal movement each about its own mounting bar 186.

The vanes 180 are oscillated about their respective mounting bars 186 by a mechanism comprising a crank 200 (FIG. 7) fixed to the previously described shaft 118. A link 202 is pivotally connected to the crank 200 at 204. The other end of the link 202 is connected by a ball and socket joint 206 to one end of a rocker bar 208. The rocker bar 208 is pivotally mounted adjacent its mid point on a pin 210 fixed to a crank arm 212. The crank arm 212 is fixed to a shaft 214 which is rotatably mounted in a sleeve 216 welded to a bracket 218 (FIG. 7) that is bolted to the machine frame by suitable bolts 220. The function of the crank arm 212 is to permit shifting of the position of the pivot pin 210 in a manner and for purposes which will be explained presently.

A link 222 (FIGS. 6 and 7) is connected at one of its ends by a ball and socket joint 224 to the above-mentioned rocker bar 208, and at its other end by a ball and socket joint 226 to one end of a second rocker bar 228. The rocker bar 228 is pivotally mounted on a pivot pin 230 fixed to a bracket 232 that is fastened at its lower edge to the previously mentioned stiffening flange 139 on the wall 110. The rocker bar 228 extends through a suitable opening 234 in the wall 110 of the air-deflecting head 19.

The rocker bar 228 actuates a vane operating rod 236 which is provided at its lower end with a ball and socket joint 238 adapted to be secured within any one of a plurality of apertures 240 provided in the rocker bar 228. It will be appreciated that the further from the pivot pin 230 that the joint 238 is secured to the rocker bar 228, the greater will be the amplitude of its movement for a given angular movement of bar 228. The upper end 242 (FIGS. 7 and 8) of the operating rod 236 is bifurcated and is pivotally secured to a bracket 244 fixed to the vane 180 which is nearest the left side of the machine.

In order that the operator may shift the crank 212 to change the position of the pivot pin 210, a lever 250 (FIGS. 2, 6 and 7) is fixed to the outer end of the shaft 214. The lever 250 is connected by a pivot pin 252 to an operating rod 254 which extends along the left side of the machine toward the front thereof. The forward portion of the operating rod 254 is provided with a plurality of notches 256 (FIG. 2) adapted to fit over a latch bar 258 fixed to the machine. When the position of the pivot pin 210 is changed, the amplitude of oscillation of the vanes 180 remains substantially the same, but the range of the oscillations is shifted so that the direction of the air blast issuing from the housing 32 is changed thereby facilitating the spraying of trees of different heights. In FIG. 8 one range of oscillation is indicated, and in FIG. 9 the other range of oscillation is indicated.

When the machine is operating, and the lever 250 is in the position illustrated in FIG. 6, the crank 200 through the link 202 causes the rocker bar 208 to rock about its pivot 210. This movement is transmitted through the link 222 to the second rocker bar 228, and then through the operating rod 236 to cause oscillation of the vanes from the full line position illustrated in FIG. 8 to the dot-dash line position and back. The amplitude of this oscillation may be preselected by adjusting the position of the lower end of the operating rod 236 relative to the rocker bar 228.

If the operator desires to lower the upper limit of the spray pattern, he may lift the operating bar 254 to release it from the latch bar 258 and draw it forward so that the fixed latch bar 258 engages a different notch on the operating bar 254. If the operating bar 254 is shifted to its forwardmost position, the lever 250 and the pivot pin 210 will be shifted to the positions indicated in FIG. 7, thereby shifting the range of oscillation of the vanes 180 which will then oscillate between the full line and dot-dash line positions illustrated in FIG. 9.

From the foregoing description it will be appreciated that, when the machine is operating, the lateral spray air blast is continuously oscillated forwardly and rearwardly, and that the spray air blast from the housing 32 is continuously oscillated upwardly and downwardly. The combined effect of these oscillations is to cause the limbs of the trees to whip and facilitate the spray penetrations of the dense foliage thereon and achieve complete saturation. It will be understood that the apparatus for forming and concentrating the air stream of the present sprayer may be supplied as a part of the sprayer or may be supplied as an attachment which may be mounted on the sprayer when it is necessary to spray dense foliage at the top of trees.

Having thus described our invention what we claim and desire to secure by Letters Patent is:

1. In an orchard sprayer having an enclosed structure providing an air flow passage with a lateral spray opening at each side, and power driven means in said enclosed structure for forcing air through said flow passage and out said lateral openings, the improvement which comprises a housing mounted on said structure and arranged to block the lateral opening on one side and to direct the air which would normally issue therefrom in a direction to augment the upper portion of the spray pattern discharged from the other side, means defining a discharge opening in said housing, a plurality of parallel air blast directing vanes pivotally mounted about substantially horizontal axes in said housing adjacent the discharge opening thereof, power driven mechanism connected to said vanes and operative to cause oscillating movement thereof to produce vertical oscillations of the augmented air blast from said housing, and means connected to said mechanism for shifting the range of the oscillations of said vanes to vary the direction of the air blast from said housing.

2. In an orchard sprayer, an enclosed structure providing an air flow passage and having a lateral spray opening at each side, power driven means in said enclosed structure for forcing air through said flow passage and out said lateral openings, a housing rigidly secured on said structure and arranged to block the lateral opening on one side and to direct the air which would normally issue therefrom in a direction to augment the upper portion of the spray pattern discharged from the other side, means defining a discharge opening in said housing, a plurality of parallel air blast directing vanes pivotally mounted in said housing adjacent the discharge opening thereof, power driven mechanism connected to said vanes and operative in timed relation with said power driven means to cause oscillating movement thereof to produce vertical oscillations of the air blast from said housing, and means connected to said mechanism for permitting adjustment of said mechanism to adjust the amplitude of the oscillation of said vanes.

3. In an orchard sprayer, an enclosed structure providing an air flow passage and having a lateral spray opening at each side, power driven means in said enclosed structure for forcing air through said flow passage and out said lateral openings, a housing rigidly secured on said structure and arranged to block the lateral opening on one side and to direct the air which would normally issue therefrom in a direction to augment the upper portion of the spray pattern discharged from the other side, means defining a discharge opening in said housing, a plurality of parallel air blast directing vanes pivotally mounted about substantially horizontal axes in said housing adjacent the discharge opening thereof, power driven mechanism connected to said vanes and operative in timed relation with said power driven means to cause oscillating movement thereof to produce vertical oscillations of the augmented air blast from said housing, means connected to said mechanism for permitting adjustment of said mechanism to adjust the amplitude of the oscillations of said vanes, and means connected to said mechanism for shifting the range of the oscillations of said vanes to vary the direction of the air blast from said housing.

4. In an orchard sprayer, an enclosed structure providing an air flow passage and having a lateral spray opening at each side, means in said enclosed structure for forcing air through said flow passage and out said lateral openings, a housing mounted on said structure and arranged to block the lateral opening on one side and to direct the air which would normally issue therefrom in a direction to augment the upper portion of the spray pattern discharged from the other side, means defining a discharge opening in said housing, a plurality of air blast directing vanes pivotally mounted within the lateral spray opening at said other side, said vanes being mounted for pivotal movement about substantially vertical axis, power driven means connected to said vanes and operative to cause oscillating movement thereof to produce horizontal oscillations of the lateral air blast, a plurality of parallel second air blast directing vanes pivotally mounted in said housing adjacent the discharge opening thereof for pivotal movement about substantially horizontal axes, and power driven mechanism connected to said second vanes and operative to cause oscillating movement thereof to produce vertical oscillations of the air blast issuing from said housing.

5. In an orchard sprayer, an enclosed housing providing an air flow passage and having a lateral spray opening at both of its sides, means in said enclosed housing for forcing air through said flow passage and out said lateral openings, a housing mounted on said structure and arranged to block the lateral opening on one side and to direct the air which would normally issue therefrom in a direction to augment the upper portion of the spray pattern issuing from the other side, means defining a discharge opening in said housing, a plurality of air blast directing vanes pivotally mounted within the lateral spray opening at said other side, said vanes being mounted for pivotal movement about substantially vertical axes, power driven means connected to said vanes and operative to cause oscillating movement thereof to produce horizontal oscillations of the lateral air blast, a plurality of parallel second air blast directing vanes pivotally mounted in said housing adjacent the discharge opening thereof for pivotal movement about substantially horizontal axes, power driven mechanism connected to said second vanes and operative to cause oscillating movement thereof to produce vertical oscillations of the air blast issuing from said housing, means connected to said mechanism for permitting adjustment of said mechanism to adjust the amplitude of the oscillations of said second vanes, and means connected to said second vanes for shifting the range of the oscillations of said second vanes to vary the direction of the air blast issuing from said housing.

6. In an orchard sprayer having an enclosed structure with a lateral spray opening at each of its sides, and means within said structure for forcing air through said enclosed structure for discharge through said spray openings, the improvement which comprises a housing adapted to block the lateral opening on one side and to direct the air which would normally issue therefrom in a direction to augment the upper portion of the spray pattern issuing from the other side, means defining a discharge opening in said housing, a plurality of parallel air blast directing vanes pivotally mounted about substantially horizontal axes extending longitudinally of the orchard sprayer in said housing adjacent the discharge opening thereof, crank means rotatably mounted in said structure, power drive means connected to said crank means for rotating said crank means, a rocker bar pivotally mounted within said structure for rocking motion, a connecting rod driven by said crank means and pivotally attached to one end of said rocker bar, means operatively connecting the other end of said rocker bar to said vanes whereby said vanes will be oscillated by the rotation of said crank means, and means connected to said rocker bar and operative to shift the position of the pivotal mounting of said rocker bar relative to said structure to change the range of oscillation of said vanes without substantially affecting the amplitude of said oscillations.

7. An attachment for use with an orchard sprayer having a lateral spray opening on one side and means for producing an air stream therein comprising, a housing arranged to be mounted on the sprayer in communication with the air stream produced therein and having means adapted to direct an air blast in a direction to augment the upper portion of the spray pattern discharged from said lateral opening, means defining a discharge opening in said housing, a plurality of parallel air blast directing vanes pivotally mounted about substantially horizontal axes extending longitudinally of the orchard sprayer in said housing adjacent the discharge opening thereof, power driven mechanism connected to said vanes and operative to cause oscillating movement thereof to produce vertical oscillations of the air blast from said housing, and means connected to said mechanism for shifting the range of the oscillations of said vanes while the sprayer is in operation to vary the direction of the air blast from said housing.

8. An attachment for use with an orchard sprayer having a lateral spray opening on either side comprising, a housing arranged to be mounted on the sprayer and having means adapted to block the lateral opening on one side of the sprayer and to direct the air which would normally issue therefrom in a direction to augment the upper portion of the spray pattern discharged from the other side of the sprayer, a plurality of air blast directing vanes pivotally mounted within the lateral spray opening at said other side, said vanes being mounted for pivotal movement about substantially vertical axes, power driven means connected to said vanes and operative to cause oscillating movement thereof to produce horizontal oscillations of the lateral air blast, a plurality of parallel second air blast directing vanes pivotally mounted in said housing adjacent the discharge opening thereof for pivotal movement about substantially horizontal axes, power driven mechanism connected to said second vanes and operative to cause oscillating movement thereof to produce vertical oscillations of the air blast issuing from said housing, and means connected to said power driven mechanism for shifting the range of the oscillations of said second vanes to vary the direction of the air blast issuing from said housing.

9. An orchard sprayer adapted for movement past trees to be treated comprising, means for creating and discharging an air blast having an upper and a lower portion in a plane extending transversely of the direction of travel of the sprayer, means connected to said air blast creating and discharging means for repeatedly oscillating the lower portion of said air blast toward and away from the vertical centerline of each tree, means connected to said air blast creating and discharging means for repeatedly oscillating the upper portion of the air blast vertically through an arcuate path lying in said plane during the oscillations of said lower portion of said air blast, and means associated with said air blast creating and discharging means for introducing pesticide into said air blast.

10. An orchard sprayer for distributing pesticide to trees and adapted for movement past the trees comprising, a housing, means connected to said housing for forming and discharging an air blast laterally thereof, said air blast having an upper and a lower portion, first air blast deflecting means mounted on said housing for pivotal movement about a vertical axis and being positioned within the path of said lower portion of said air blast, first drive means operatively connected with said first air blast deflecting means to cyclically oscillate said first air blast deflecting means through a plurality of cycles while treating said trees, second air blast deflecting means mounted on said housing for pivotal movement about a horizontal axis and being positioned within the path of said upper portion of said air blast, second drive means operatively connected with said second air blast deflecting means to cyclically oscillate said second air blast deflecting means through a plurality of cycles while treating said trees, and means connected to said housing for supplying pesticide to said air blast.

11. In an orchard sprayer, an enclosed structure providing an air flow passage and having a lateral spray opening at each side, means in said enclosed structure for forcing air through said flow passage and out said lateral openings, a housing mounted on said structure and arranged to block the lateral opening on one side and to direct the air which would normally issue therefrom in a direction to augment the upper portion of the spray pattern discharged from the other side, means defining a discharge opening in an upper portion of said housing, air blast directing means mounted for pivotal movement about a substantially vertical axis within the lateral spray opening at said other side, power driven means connected to said air blast directing means and operative to cause oscillating movement thereof to produce horizontal oscillations of the lateral air blast, a plurality of parallel air blast directing vanes pivotally mounted in said housing adjacent the discharge opening thereof for pivotal movement about substantially horizontal axes, and power driven mechanism connected to said vanes and operative to cause oscillating movement thereof to produce vertical oscillations of the air blast issuing from said housing.

References Cited in the file of this patent

UNITED STATES PATENTS

| | | |
|---|---|---|
| 2,331,107 | Daugherty | Oct. 5, 1943 |
| 2,583,753 | Spreng et al. | Jan. 29, 1952 |
| 2,641,504 | Robinson | June 9, 1953 |
| 2,685,476 | Spreng | Aug. 3, 1954 |
| 2,706,596 | Hait | Apr. 19, 1955 |
| 2,736,605 | Spreng | Feb. 28, 1956 |
| 2,761,731 | Fish | Sept. 4, 1956 |
| 2,784,521 | Britten et al. | Mar. 12, 1957 |